United States Patent [19]

De Mario

[11] Patent Number: 4,729,867

[45] Date of Patent: Mar. 8, 1988

[54] SPRING RETAINER APPARATUS AND METHOD FOR FACILITATING LOADING OF FUEL RODS INTO A FUEL ASSEMBLY GRID

[75] Inventor: Edmund E. De Mario, Pittsburgh, Pa.

[73] Assignee: Westinghouse Electric Corp., Pittsburgh, Pa.

[21] Appl. No.: 881,996

[22] Filed: Jul. 3, 1986

[51] Int. Cl.$^4$ ............................................. G21C 19/00
[52] U.S. Cl. ..................................... 376/261; 29/238; 29/400 N
[58] Field of Search ................... 376/261, 446; 29/723, 29/400 N, 238

[56] References Cited

U.S. PATENT DOCUMENTS

| | | | |
|---|---|---|---|
| 3,665,586 | 5/1972 | Jabsen | 376/446 |
| 3,770,582 | 11/1973 | Rogell | 376/446 |
| 3,892,027 | 7/1975 | Jabsen | 376/446 |
| 3,982,994 | 9/1976 | Jabsen | 376/446 |
| 4,058,224 | 11/1977 | Jabsen | 214/1 CM |
| 4,175,000 | 11/1979 | Jabsen | 376/446 |
| 4,215,597 | 8/1980 | Miller et al. | 29/238 |
| 4,427,622 | 1/1984 | Knecht et al. | 376/446 |
| 4,651,403 | 3/1987 | DeMario et al. | 376/261 |

FOREIGN PATENT DOCUMENTS

| | | | |
|---|---|---|---|
| 2560423 | 8/1985 | France | 376/261 |
| 0038485 | 3/1979 | Japan | 376/272 |
| 0067891 | 4/1985 | Japan | 376/261 |
| 2109152 | 5/1983 | United Kingdom | 376/261 |

*Primary Examiner*—Deborah L. Kyle
*Assistant Examiner*—Daniel Wasil

[57] ABSTRACT

A spring retainer apparatus includes a pair of assemblies adapted to engage and retain pairs of back-to-back springs of a fuel assembly grid in retracted positions for facilitating the loading of fuel rods into cells of the grid in a scratch-free manner. Each spring retainer assembly has elongated holder bars and a handle bar interconnecting the holder bars together at the same ends thereof so that the holder bars can be concurrently extended along and aligned with the straps of the grid which define the pairs of springs. Also, members are supported by each holder bar which correspond in number to the pairs of springs defined by the straps aligned with the holder bar. Each member has a terminal end configured to engage and retain the springs in their retracted positions when the respective holder bar supporting the member is aligned with and moved toward the springs. The terminal end of each member is bifuracted to define a pocket adapted to receive a pair of springs and retain them in their retracted position and a tapered entrance to the pocket for facilitating insertion of the springs into the pocket.

13 Claims, 22 Drawing Figures

SPRING RETAINER APPARATUS AND METHOD FOR FACILITATING LOADING OF FUEL RODS INTO A FUEL ASSEMBLY GRID

CROSS REFERENCE TO RELATED APPLICATIONS

Reference is hereby made to the following copending U.S. patent applications dealing with related subject matter and assigned to the assignee of the present invention: "Apparatus and Method For Loading Fuel Rods Into Grids Of A Fuel Assembly" by E. E. DeMario et al, assigned U.S. Ser. No. 717,263 and filed Mar. 28, 1985, now U.S. Pat. No. 4,651,403.

BACKGROUND OF THE INVENTION

1. Field of the Invention

The present invention relates generally to nuclear reactors and, more particularly, is concerned with spring retainer apparatus and method for facilitating loading of fuel rods into grid of a fuel assembly without incurring scratches on the exterior surfaces of the fuel rods.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a nuetron moderator. Specifically, in a boiling water reactor (BWR) the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces.

In a fuel assembly of this type the fuel rods in the central region of the bundle thereof may be under-moderated and overenriched. In order to remedy this condition by increasing the flow of moderator water through this region of the assembly, an elongated centrally-disposed water cross is frequently used in the assembly. The central water cross has a plurality of four radial panels which together form a cruciform water flow channel which divides the fuel assembly into four, separate elongated compartments, with the bundle of fuel rods being divided into mini-bundles disposed in the respective compartments. The water cross thus provides a centrally-disposed cross-shaped path for the flow of subcooled neutron moderator water within the channel along the lengths of, but separated from, adjacent fuel rods in the mini-bundles thereof. The fuel rods of each mini-bundle extend in laterally spaced apart relationship between an upper tie plate and a lower tie plate and connected together with the tie plates to comprise a separate fuel rod subassembly within each of the compartments of the channel. The water cross has approximately the same axial length as the fuel rod subassemblies, extending between the upper and lower tie plates thereof.

Additionally, a plurality of spacers or grids, for example six in number, are disposed at axially displaced positions along the fuel rods of each fuel rod subassembly to maintain the fuel rods in their laterally spaced relationships. The grids have interleaved straps which define a multiplicity of cells disposed in vertical alignment. The fuel rods are supported in an organized and transversely spaced array in the vertically aligned cells of the grids by springs and dimples on the straps which extend into the cells. Thus, the grids are introduced to maintain the desired fuel mini-bundle configuration and to prevent excessive fuel rod bow and flow induced vibrations, and thereby provide significant benefits from a structural standpoint.

In the common way of loading fuel rods into the fuel assembly grids containing the springs and dimples for holding the fuel rods in place, the fuel rods are ordinarily scraped by the springs and dimples as they enter the grid cells. Such scraping produces scratches which provide sites for accelerated corrision of the exterior surfaces of the fuel rods and debris for release into the coolant flow system of the reactor.

Devices are known for deflecting the springs of the fuel assembly grids for facilitating insertion of the fuel rods without marring the surfaces thereof. Representative of the prior art are the devices disclosed in U.S. Pat. Nos. 3,982,994 and 4,058,224 to Jabsen. While these prior art devices would appear to operate reasonably well and generally achieve their objectives under the range of operating conditions for which they were designed, they seem to embody shortcomings which make them less than an optimum solution to the problem of scratch-free loading of the fuel rods. The devices require openings in the straps of the grid through which their actuating parts must be inserted to position them for deflecting the grid springs. Such openings may tend to weaken the grid structure. Also, operation of such devices in deflecting the grid springs appears to be unduly complicated.

Consequently, a need exists for a fresh approach to insertion of fuel rods into the grids which will avoid or reduce the damage to the exterior surfaces of the fuel rods and at the same time be less complicated in operation.

SUMMARY OF THE INVENTION

The present invention provides a spring retainer apparatus and method which are designed to satisfy the aforementioned needs. Specifically, the spring retainer apparatus facilitates loading the fuel rods into the fuel assembly grids in a scratch-free way. The springs of the grids are held in retracted positions so as to provide sufficient clearance for entry of the fuel rods without contacting the springs and dimples of the grid and thus without incurring scratching of the fuel rod exterior surfaces.

Accordingly, the present invention relates to a spring retainer apparatus for facilitating the loading of fuel rods into a fuel assembly. The fuel assembly has at least one grid formed of interleaved straps defining a plurality of hollow cells for respectively receiving the fuel rods. At least some of the straps are disposed in pairs thereof so as to form springs in pairs thereof positioned in back-to-back relationships between adjacent ones of the cells. The springs in each pair thereof are configured to normally assume expanded positions in which they are displaced away from one another to engage fuel rods received in the respective cells and are deflectible to retracted positions in which they are displaced toward one another to allow loading of the fuel rods in the respective cells without engaging the springs.

The spring retainer apparatus comprises: (a) a plurality of elongated holder bars, each holder bar being alignable with one of the pairs of the straps of the grid which defines the pairs of springs and extendible along one strap pair and between and spaced from positions occupied by fuel rods when received in the cells of the grid; and (b) a plurality of members supported by each of the holder bars corresponding to the pairs of springs defined by the pair of straps aligned with the holder bar; (c) each of the members having a terminal end configured to engage and retain the springs of one of the pairs thereof in their retracted positions when the respective holder bar supporting the member is aligned with and moved toward the pair of straps aligned with the holder bar.

More particularly, each of the members is an elongated post with the terminal end of the member being a bifurcated end on the post. The bifurcated post end defines at least one pair of spaced apart fingers adapted to receive the pair of springs therebetween for retaining the springs in their retracted positions. Preferably, the bifurcated end on each of the posts defines two spaced pairs of spaced apart fingers adapted to receive the pair of springs therebetween and engage the spring pair at two displaced locations therealong for retaining them in their retracted positions. Also, each member in the plurality thereof supported by a respective one holder bar is rigidly connected to and extends from the bar in a generally parallel relationship with respect to the other members supported by the bar.

Specifically, the terminal end of each member defines a pocket adapted to receive the pair of springs therein and retain the springs in their retracted positions and a convergently-tapered entrance to the pocket for facilitating insertion of the springs when in their retracted positions into the pocket. Preferably, the convergently-tapered entrance to the pocket also causes deflection of the springs from their normal extanded positions to their retracted positions as the springs are inserted into the pocket.

The present invention also relates to a spring retainer method for facilitating the loading of fuel rods into a fuel assembly, comprising the steps of: (a) aligning a plurality of elongated holder bars with pairs of the straps of the grid which define the pairs of the springs such that the holder bars extend along the strap pairs and between and spaced from positions occupied by fuel rods when received in the cells of the grid; and (b) moving the holder bars toward the pairs of the straps to position terminal ends of members supported by each of the holder bars in engagement with the springs to retain the springs in their retracted positions. More particularly, moving of the holder bars toward the strap pairs causes deflection of the springs from normal expanded positions to retracted positions and retention of the retracted springs in their retracted positions.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made the the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 1:
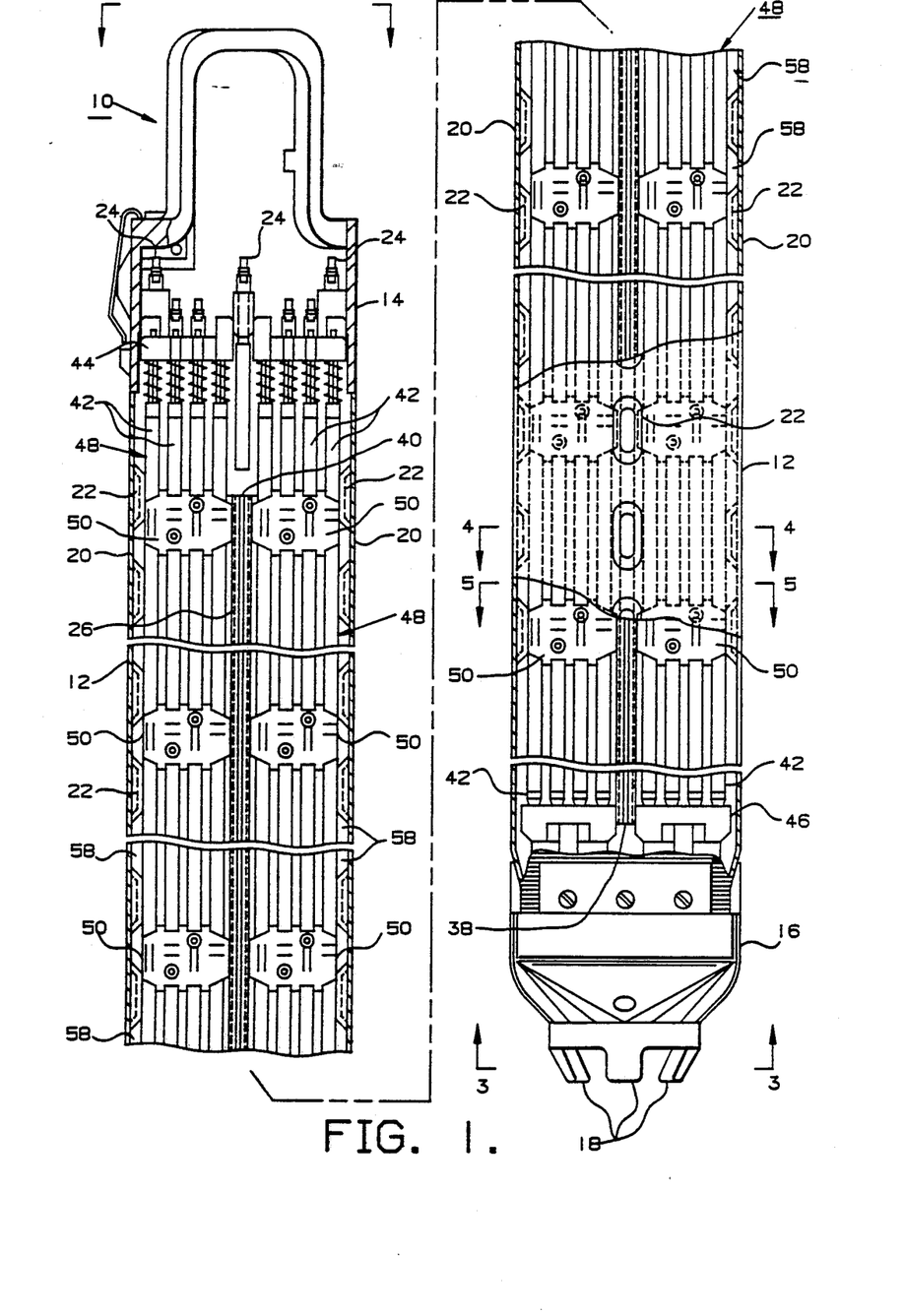
FIG. 1 is an elevational view, with parts broken away and sectioned for clarity, of a BWR nuclear fuel assembly in conjunction with which the spring retainer apparatus of the present invention can be utilized for loading the fuel rods into the grids of the fuel assembly.
Figure 2:
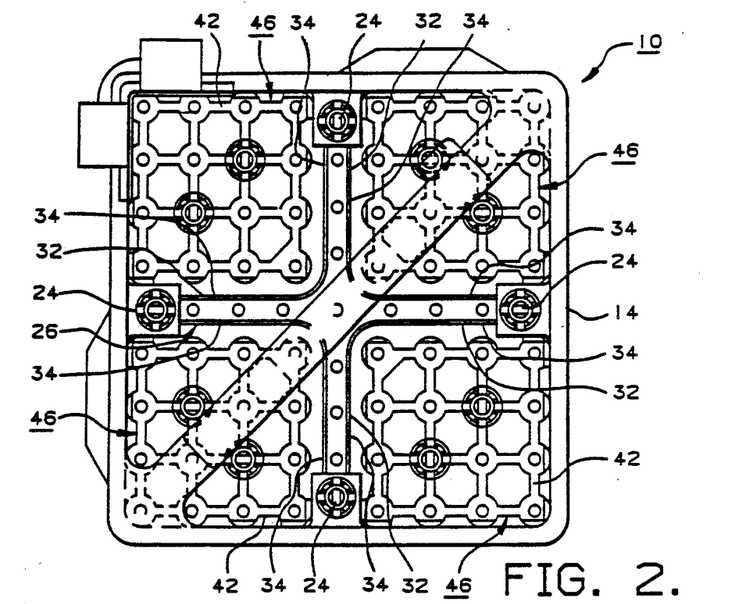
FIG. 2 is an enlarged top plan view of the fuel assembly as seen along line 2—2 of FIG. 1.
Figure 3:
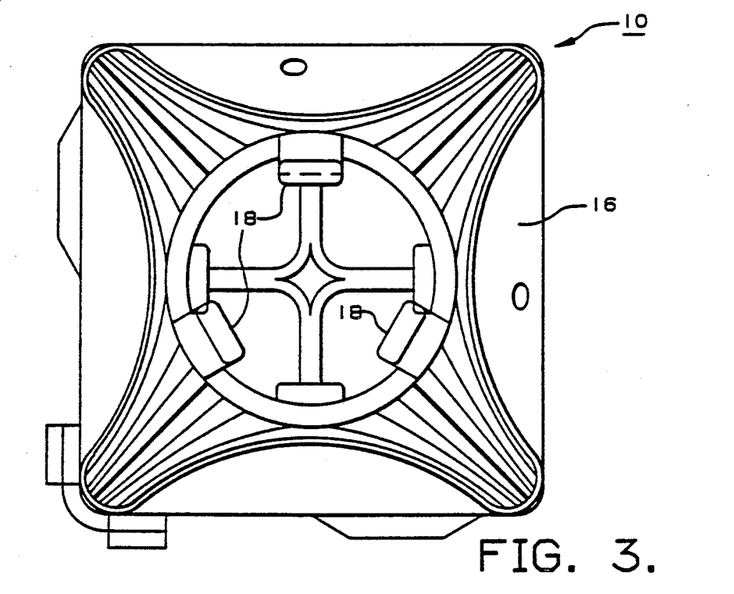
FIG. 3 is an enlarged bottom plan view of the fuel assembly as seen along line 3—3 of FIG. 1.

Referring now to the drawings, and particularly to FIGS. 1 to 3, there is shown a nuclear fuel assembly, generally designated 10 for a boiling water nuclear power reactor (BWR), with which the spring retainer apparatus (FIGS. 11 to 17) of the present invention can be employed, as will be described later on. The fuel assembly 10 includes an elongated outer tubular flow channel 12 that extends along substantially the entire length of the fuel assembly 10 and interconnects an upper support fixture of top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example, in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
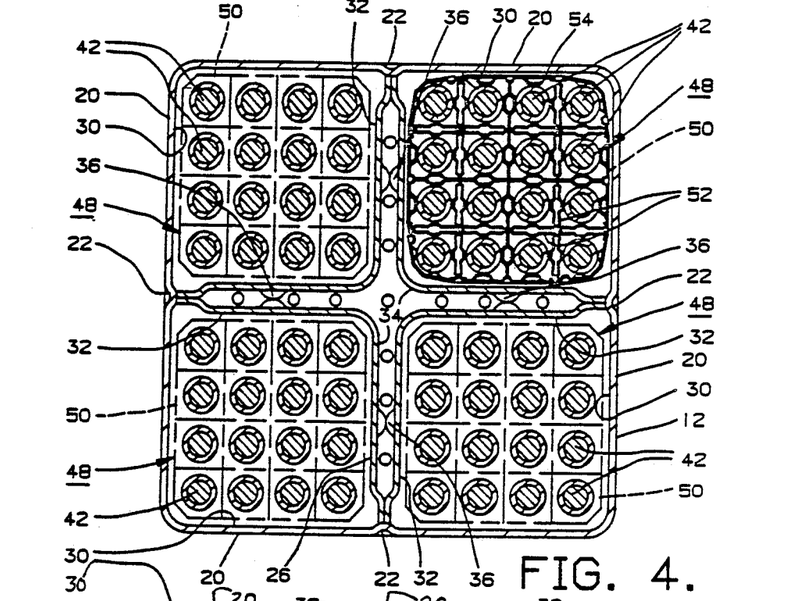
FIG. 4 is a cross-sectional view of the fuel assembly taken along line 4—4 of FIG. 1, showing the fuel rod bundle of the fuel assembly being separated into separate mini-bundles by the water cross with a grid surrounding one of the mini-bundles being shown in full, while the grids surrounding the other three mini-bundles are shown in outline form.
Figure 5:
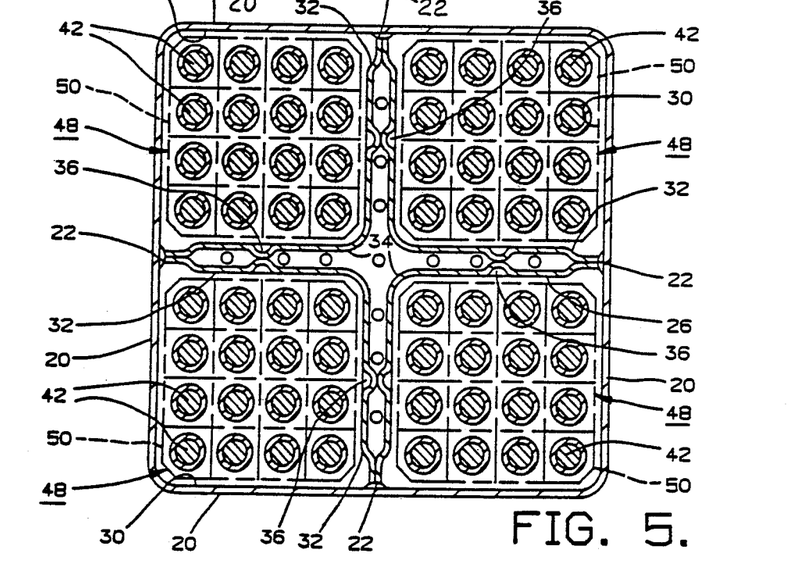
FIG. 5 is another cross-sectional view of the fuel assembly similar to that of FIG. 4, but taken along line 5—5 of FIG. 1.

For improving neutron moderation and economy, a hollow water cross, as seen in FIGS. 1, 2 and 4 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12. The sheet members 34 of each panel 32 are interconnected and spaced apart by a series of elements in the form of dimples 36 formed therein and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated lateral ends of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 38 and an opposite upper flow outlet end 40 which each communicates with the inner channel 28 for providing subcoolant flow therethrough.

Disposed within the channel 12 us a bundle of fuel rods 42 which, in the illustrated embodiment, number sixty-four and form an 8×8 array. The fuel rod bundle is, in turn, separated into four mini-bundles thereof by the water cross 26. The fuel rods 42 of each mini-bundle, such being sixteen in number in a 4×4 array, extend in laterally spaced apart relationship between an upper tie plate 44 and a lower tie plate 46. The fuel rods 42 in each mini-bundle are connected to the upper and lower tie plates 44,46 and together therewith comprise a separate fuel rod subassembly 48 within each of the compartments 30 of the channel 12. A plurality of spacers or grids 50 axially spaced along the fuel rods 42 of each fuel rod subassembly 48 are composed of interleaved inner straps 52 and an outer strap 54 which maintain the fuel rods in their laterally spaced relationships. The lower and upper tie plates 44,46 of the respective fuel rod subassemblies 48 have flow openings 56 defined therethrough for allowing the flow of the coolant fluid into and from the separate fuel rod subassemblies. Also, coolant flow paths provide flow communication between the fuel rod subassemblies 48 in the respective separate compartments 30 of the fuel assembly 10 through a plurality of openings 58 formed between each of the structural ribs 22 along the lengths thereof. Coolant flow through the openings 58 serves to equalize the hydraulic pressure between the four separate compartments 30, thereby minimizing the possibility of thermal hydrodynamic instability between the separate fuel rod subassemblies 48.

Apparatus for Loading Fuel Rods into Grids

Figure 6:
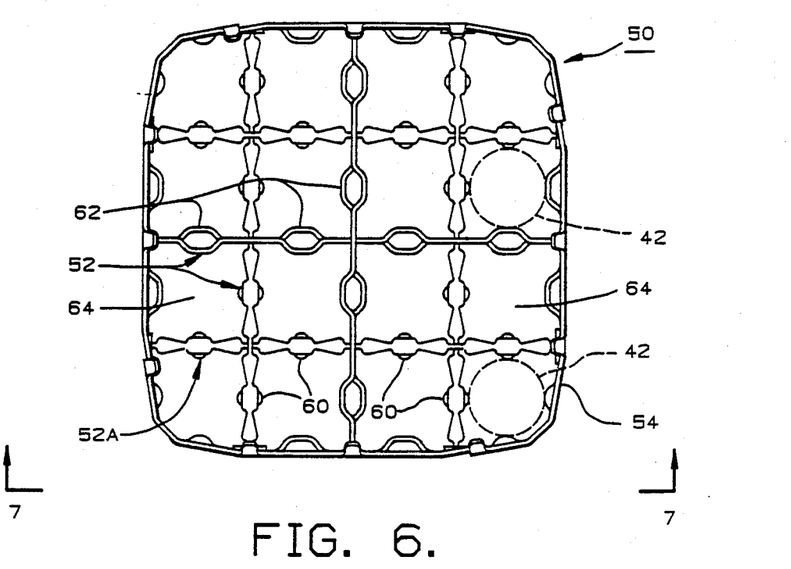
FIG. 6 is an enlarged top plan view of the upper right hand grid seen in FIG. 4, showing the springs of the grid in expanded positions in which they normally engage and together with opposite dimples hold the fuel rods which extend through the cells of the grid.
Figure 7:
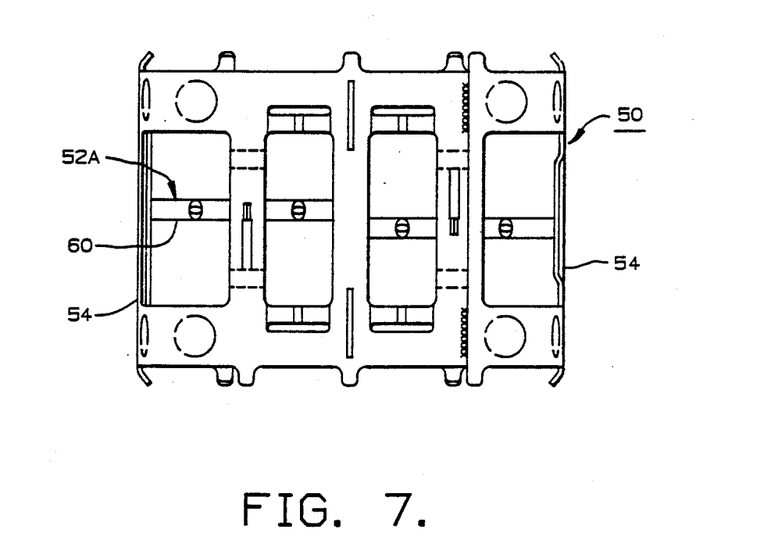
FIG. 7 is a side elevational view of the grid as seen along line 7—7 of FIG. 6.

In the normal manner of loading fuel rods 42 through the fuel assembly grid 50, springs 60 and dimples 62 defined by the inner straps 52 and normally extending into the hollow cells 64 formed by the interleaved straps, as seen in FIGS. 6 and 7, will rub against the fuel rod outer surfaces and cause scratching thereof. Not only is the external appearance of the fuel rods 42 adversely affected, more importantly accelerated corrosion is likely to occur at the scratch sites and debris formed by material from the scratch is released into the coolant flow through the fuel assembly 10.

Figure 8:
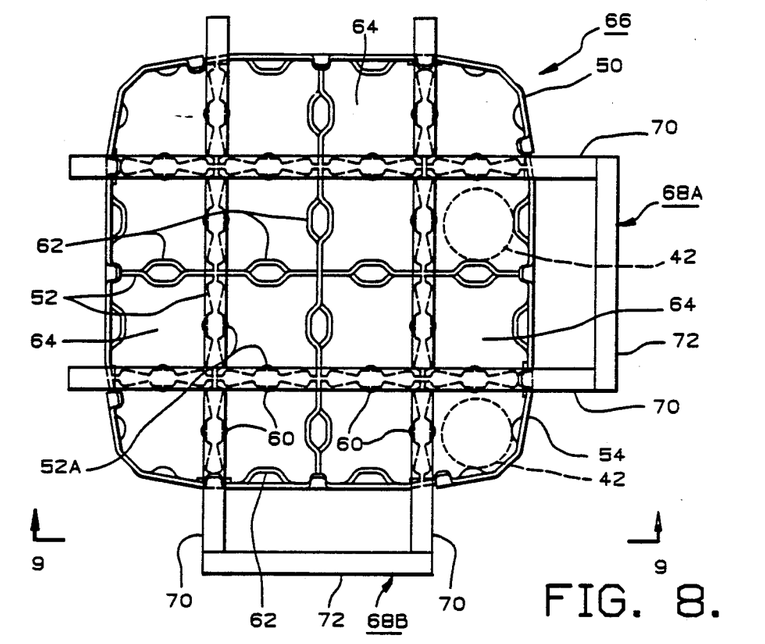
FIG. 8 is a top plan view similar to that of FIG. 6, but showing the pairs of assemblies of the spring retainer apparatus installed on the grid so as to hold the respective springs of the grid in retracted positions.
Figure 9:
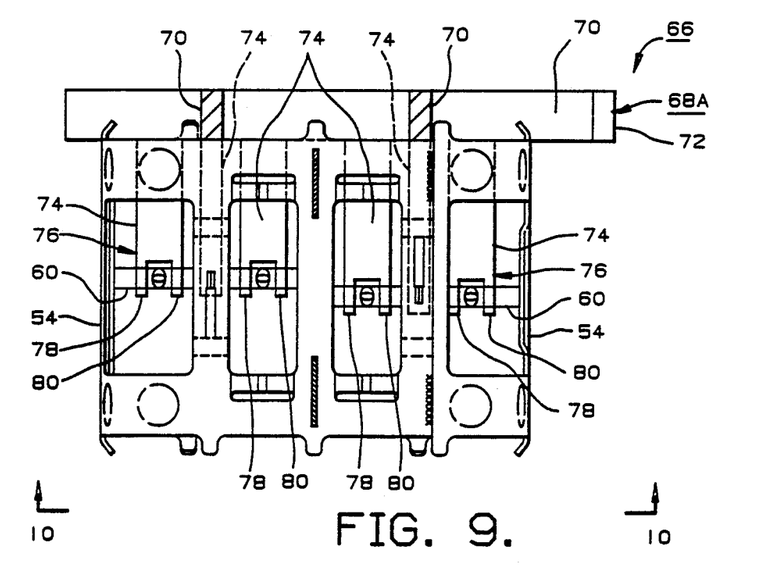
FIG. 9 is a side elevational view, partly sectioned, of the grid and spring retainer assemblies as seen along line 9—9 of FIG. 8.
Figure 10:
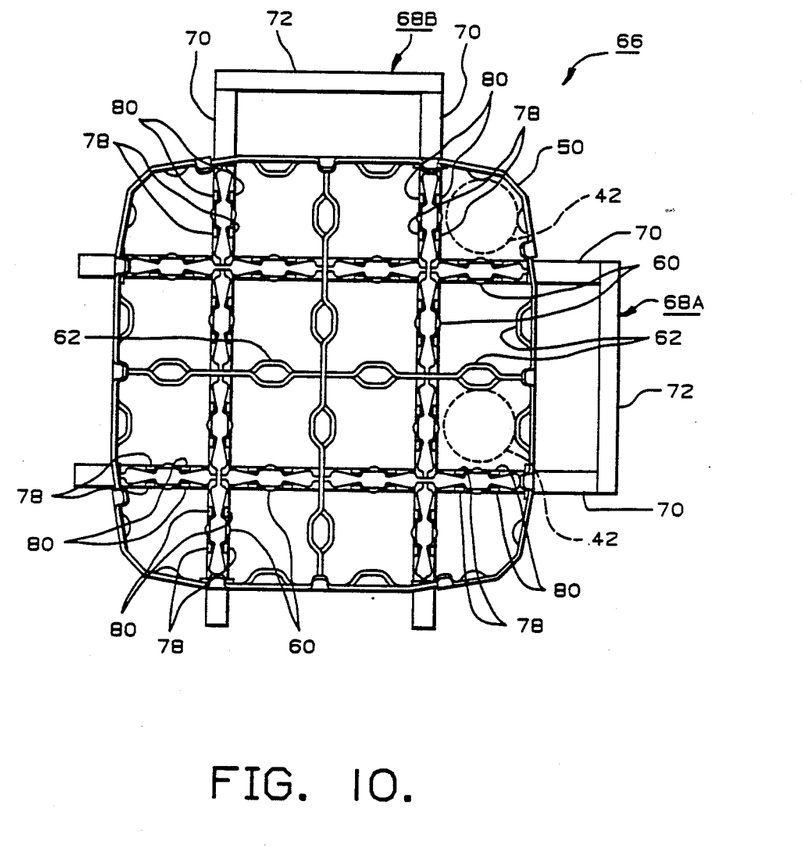
FIG. 10 is a bottom plan view of the grid and spring retainer assemblies as seen along line 10—10 of FIG. 9.
Figure 11:
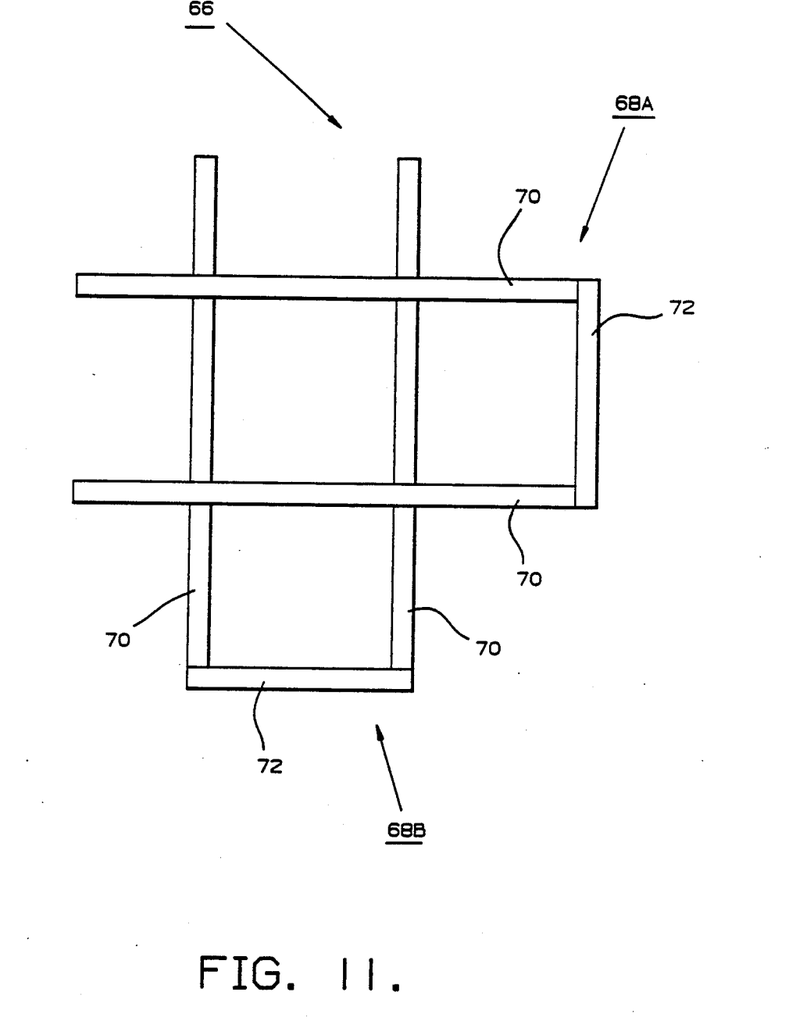
FIG. 11 is a top plan view similar to that of FIG. 8, but showing the spring retainer assemblies removed from the grid.
Figure 12:
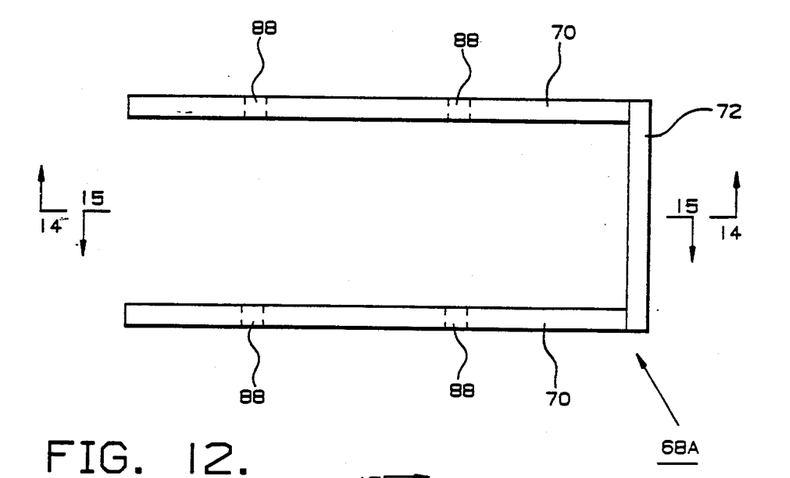
FIG. 12 is a top plan view of one of the pair of spring retainer assemblies seen in FIG. 11.
Figure 13:
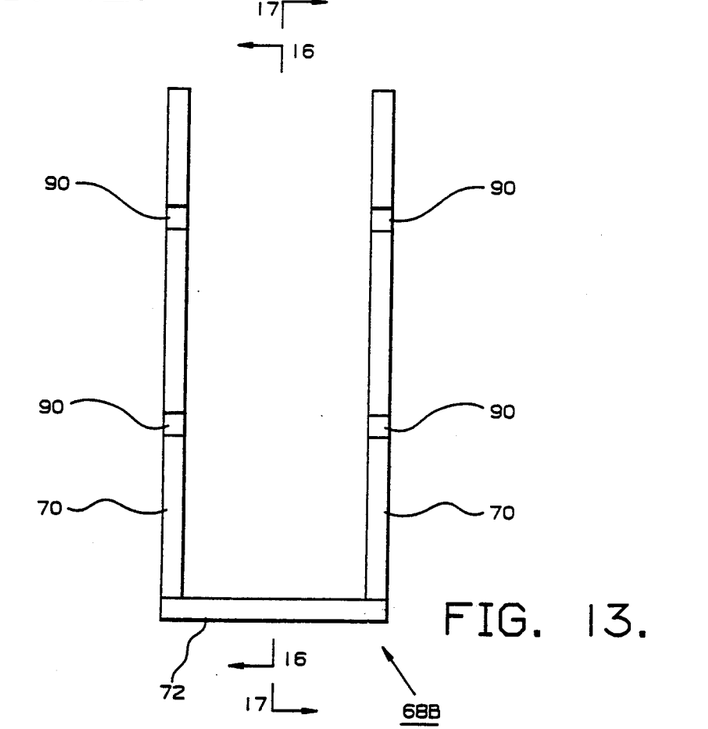
FIG. 13 is a top plan view of the other of the pair of spring retainer assemblies seen in FIG. 11.
Figure 14:
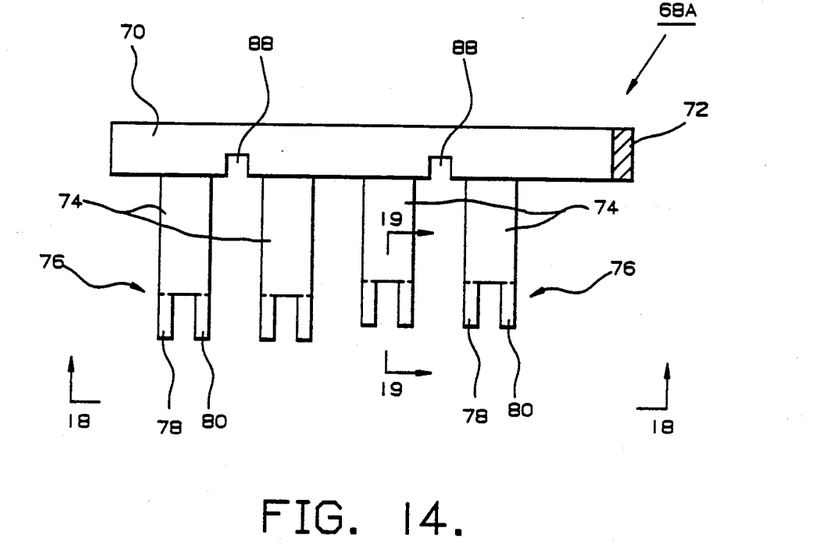
FIG. 14 is a side elevational view, partly in section, of the one spring retainer assembly as seen along line 14—14 of FIG. 12.
Figure 15:
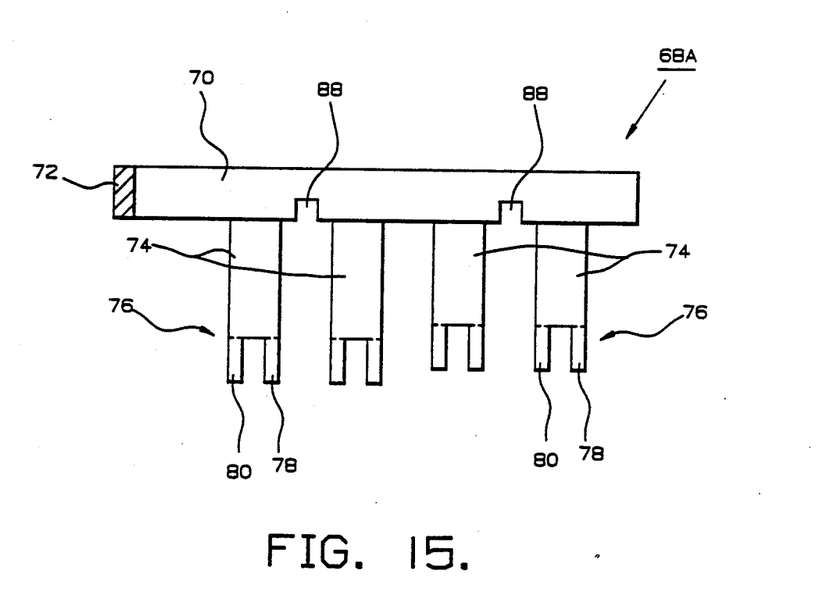
FIG. 15 is another side elevational view, partly in section, similar to that of FIG. 14, but seen along line 15—15 of FIG. 12.
Figure 16:
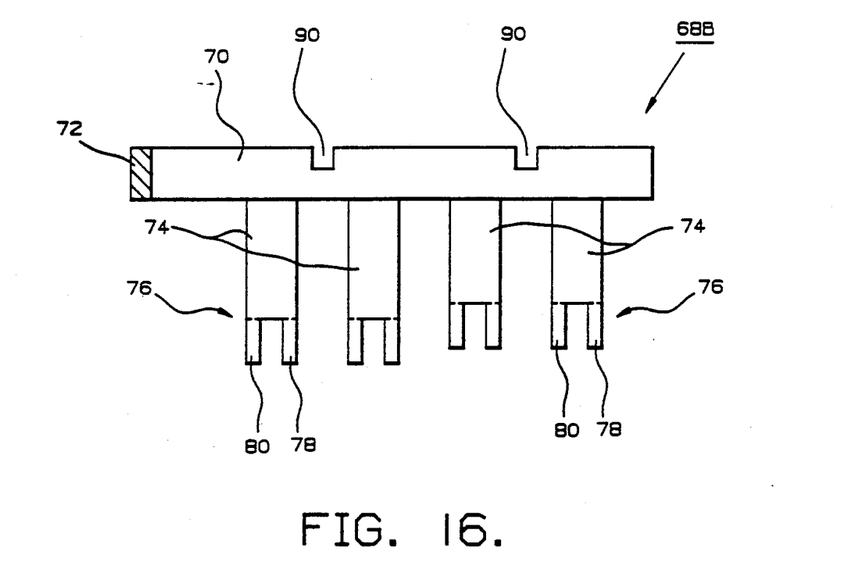
FIG. 16 is a side elevational view, partly in section, of the other spring retainer assembly as seen along line 16—16 of FIG. 13.
Figure 17:
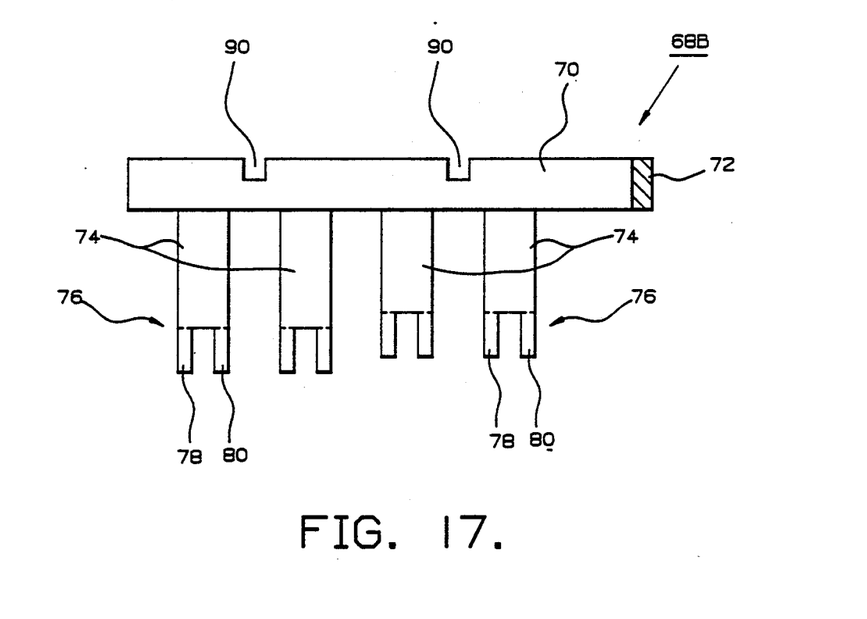
FIG. 17 is another side elevational view, partly in section, similar to that of FIG. 16, but as seen along line 17—17 of FIG. 13.

Referring now to FIGS. 8 to 20 in addition to FIGS. 6 and 7, in accordance with the present invention, a spring retainer apparatus, generally designated 66, is provided for facilitating the loading of the fuel rods 42 into the cells 64 of the fuel assembly grid 50 in a manner which minimizes marring or scratching of the outer surfaces of the fuel rods. It will be noted that some of the inner straps 52A are disposed in pairs so as to form the springs 60 in pairs thereof which are positioned in back-to-back relationships between adjacent ones of cells 64. The springs 60 in each pair thereof are configured to normally assume expanded positions, as seen in FIG. 6, in which they are displaced away from one another to engage the fuel rods 42 when received in the respective cells 64. However, using the apparatus 66 of the present invention, the springs 60 in each pair thereof can be deflected to retracted positions, as seen in FIGS. 8 and 10, in which they are displaced toward one another to provide the clearance necessary to allow loading of the fuel rods 42 in the respective cells 64 without engaging the springs 60.

More particularly, as seen in FIGS. 8 to 17, the spring retainer apparatus 66 includes a pair of first and second spring retainer assemblies 68A, 68B which are substantially identical. Each of the spring retainer assemblies 68A, 68B includes a pair of elongated holder bars 70 and a handle bar 72 interconnecting the holder bars together at the same one of the opposite ends thereof so that the holder bars 70 are concurrently extended along and aligned with a pair of the straps 52A of the grid 50 which define the pairs of springs 60. The sizes of the cross-sectional dimensions of the holder bars 70 are designed to allow the bars to be extended between and spaced from positions occupied by fuel rods 42 when received in the cells 64 of the grid 50 so that neither the bars 70 nor the springs 60 held in retracted positions by the assemblies 68 will engage nor interfere with the fuel rods 42 during loading thereof.

In addition, each of the holder bars 70 of the spring retainer assemblies 68A, 68B supports a number of depending members 74. The number of such members 74 corresponds to the number of pairs of springs 60 defined by the pair of straps 52A aligned with the specific holder bar 70. In the illustrated embodiment, both the members 74 on each bar 70 and the springs 60 aligned with each bar are four in number.

Each of the depending members 74 has a terminal end 76 configured to engage and retain the springs 60 of one pair thereof in their retracted positions when the respective holder bar 70 supporting the member 74 is aligned with and moved toward the pair of straps 52A aligned with the holder bar 70. Preferably, each of the members 74 supported by a respective one holder bar 70 is rigidly connected to and extends from the bar in a generally parallel relationship with respect to the other members 74 supported by the bar. Further, each member 74 is an elongated post with the terminal end 76 of the member being a bifurcated end on the post. The bifurcated end 76 on each of the posts 74 defines two spaced pairs of spaced apart fingers 78,80 adapted to receive the pair of springs 60 therebetween and engage the spring pair at two displaced locations therealong, as depicted in FIG. 10, for retaining them in their retracted positions.

Figures 18, 19, 20, 21, 22:
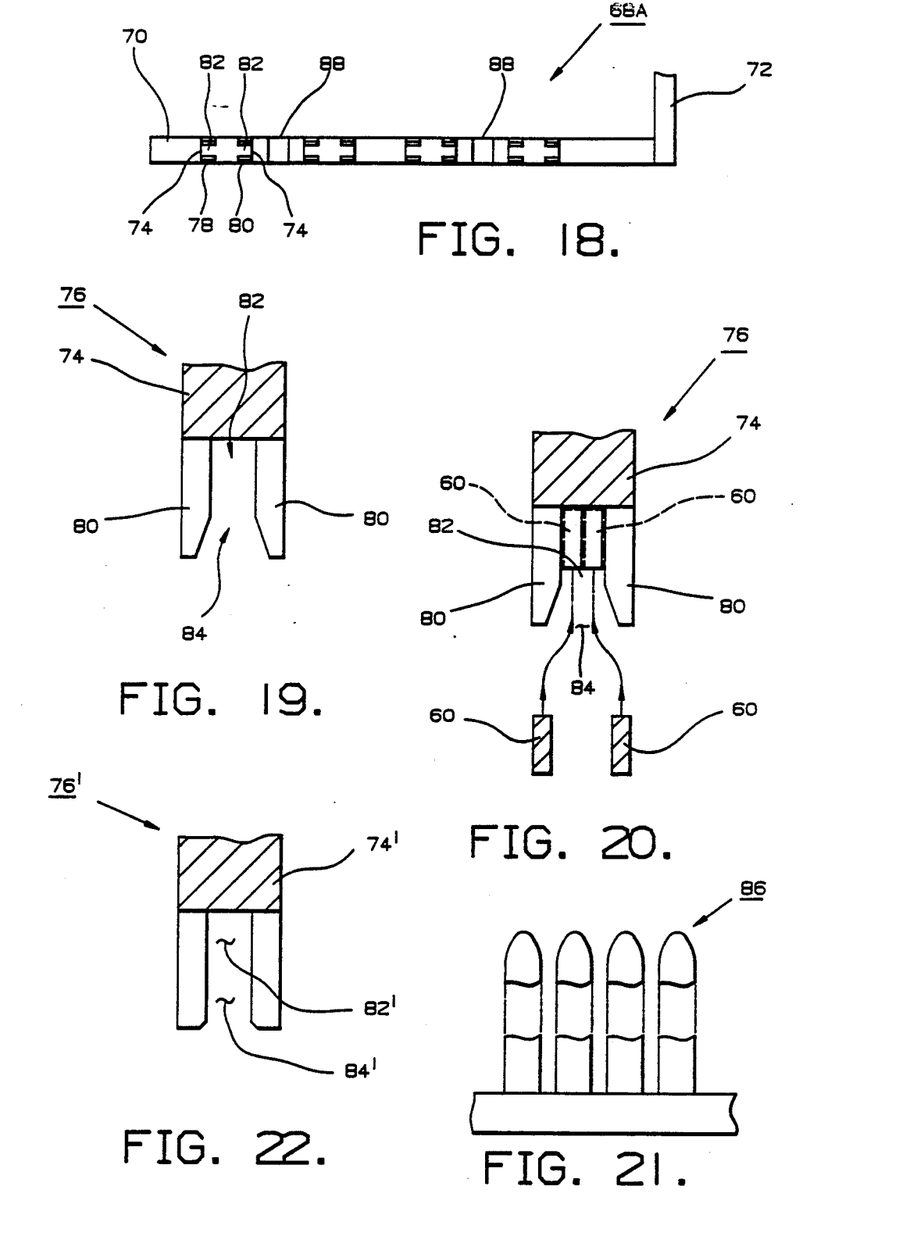
FIG. 18 is a bottom plan view of a fragmentary portion of the one spring retainer as seen along line 18—18 of FIG. 14.
FIG. 19 is an enlarged fragmentary view, partly in section, of a lower bifurcated end of one depending member of one spring retainer assembly as seen along line 19—19 of FIG. 14.
FIG. 20 is a view similar to that of FIG. 19, but illustrating how the lower bifurcated end of the spring retainer assembly member actuates a pair of grid springs between their expanded positions shown in full and their retracted positions shown in phantom.
FIG. 21 is a fragmentary elevational view of a fixture having dummy rods for actuating the grid springs to their retracted positions.
FIG. 22 is a view similar to that of FIG. 19, but showing an alternative form of the lower bifurcated end of a spring retainer assembly member used in conjunction with the fixture of FIG. 21 to retain a pair of springs in their retracted positions after being actuated to such positions by the fixture.

Many configurations are possible for defining the bifurcated ends 76 of the posts 74, the configurations seen in FIGS. 19 and 20 being merely one example. The important feature, whatever the particular configuration or structure of the fingers 78,80 might be, is that the bifurcated terminal end of each post 74 should define a pocket 82 adapted to receive the pair of springs 60 therein and retain the springs in their retracted positions, as represented in FIG. 20, and a convergently-tapered entrance 84 to the pocket 82 for facilitating insertion of the springs 60 when in their retracted positions into the pocket.

In the preferred embodiment seen in FIGS. 19 and 20, the tapered entrance 84 is of sufficient size (i.e., length and width) to cause deflection of the springs 60 from their normal expanded positions to their retracted positions, both of which are depicted in FIG. 20, as the post 74 is moved toward and into contact with the springs 60 at its bifurcated end 76.

However, in an alternative embodiment seen in FIG. 22, the tapered entrance 84' to the pocket 82' defined on each post 74' is insufficient in size to cause such deflection of the springs 60. So here, a fixture 86 of dummy fuel rods is first inserted into the cells 64 of the grid 50 to deflect the springs 60 to their retracted positions and then bifurcated terminal ends 76' of the posts 74' are inserted on the retracted springs to retain them in such positions.

Finally, the holder bars 70 of the respective first and second spring retainer assemblies 68A, 68B have mating means permitting the assemblies to be superimposed one on top of the other, as seen in FIGS. 8 to 11, in crisscross fashion and interconnected in alignment with all of the pairs of the springs 60 defined by the straps 52A of the grid 50. Particularly, the mating means on the holder bars 70 are in the form of aligned notches 88,90 defined in the respective holder bars. It will be noted that the notches 88 of the assembly 68A open downwardly, whereas the notches 90 of assembly 68B open upwardly.

It will be observed that some of the posts 74 on the holder bars 70 are slightly larger than other of the posts. This is because the sets of the four radial springs 60 in the different quadrants of the grid 50, as seen in FIGS. 7 and 9, are disposed at different levels within the grid due to the manner in which the springs 60 are attached to other of the inner straps 52 which define the dimples 62.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. For use with a fuel assembly having at least one grid formed of interleaved straps defining a plurality of hollow cells for respectively receiving a plurality of fuel rods, at least some of said straps being disposed in pairs thereof so as to form springs in pairs thereof being positioned in back-to-back relationships between adjacent ones of said cells, said springs in each pair thereof being configured to normally assume expanded positions in which they are displaced away from one another to engage fuel rods received in said respective cells and being deflectible to retracted positions in which they are displaced toward one another to allow loading of the fuel rods in said respective cells without engaging said springs, a spring retainer apparatus for facilitating the loading of said fuel rods into said cells of said fuel assembly grid, comprising:

(a) a plurality of elongated holder bars, each holder bar being alignable with one of said pairs of said straps of said grid which defines said pairs of springs and extendible along, and in spaced relation from, said one strap pair and between and spaced from positions occupied by fuel rods when received in said cells of said grid; and (b) a plurality of members supported by each of said holder bars corresponding to said pairs of springs defined by said pair of straps aligned with said holder bar;

(c) each of said members having a terminal end configured to engage and retain said springs of one of said pairs thereof in their retracted positions when said respective holder bar supporting said member is aligned with and moved toward said pair of straps aligned with said holder bar;

(d) each of said members being an elongated post with said terminal end of said member being a bifurcated end on said post defining at least one pair of spaced apart fingers adapted to receive said pair of springs therebetween for retaining said springs in their retracted positions.

2. The spring retainer apparatus as recited in claim 1, wherein said bifurcated end on each of said posts define two spaced pairs of spaced apart fingers adapted to receive said pair of springs therebetween and engage said pair at two displaced locations therealong for retaining them in their retracted positions.

3. The spring retainer apparatus as recited in claim 1, wherein each member in said plurality thereof supported by a respective one holder bar is rigidly connected to and extends from said bar in a generally parallel relationship with respect to the other members of said plurality thereof supported by said bar.

4. The spring retainer apparatus as recited in claim 1, wherein said bifurcated terminal end of each member defines a pocket adapted to receive said pair of springs therein and retain said springs in their retracted positions and a convergently-tapered entrance to said pocket for facilitating insertion of said springs when in their retracted positions into said pocket.

5. The spring retainer apparatus as recited in claim 1, wherein said bifurcated terminal end of each member defines a pocket adapted to receive said pair of springs therein and retain said springs in their retracted positions and a convergently-tapered entrance to said pocket for causing deflection of said springs from their normal expanded positions to their retracted positions and facilitating insertion of said retracted springs into said pocket.

6. For use with a fuel assembly having at least one grid formed of interleaved straps defining a plurality of hollow cells for respectively receiving a plurality of fuel rods, at least some of said straps being disposed in pairs thereof so as to form springs in pairs thereof being positioned in back-to-back relationships between adjacent ones of said cells, said springs in each pair thereof being configured to normally assume expanded positions in which they are displaced away from one another to engage fuel rods received in said respective cells and being deflectible to retracted positions in which they are displaced toward one another to allow loading of the fuel rods in said respective cells without engaging said springs, a spring retainer apparatus for facilitating the loading of said fuel rods into said cells of said fuel assembly grid, comprising:

(a) first and second spring retainer assemblies, each of said spring retainer assemblies including (i) a plurality of elongated holder bars, (ii) a handle bar interconnecting said holder bars together at the same one of the ends thereof so that said bars can be concurrently extended along, in spaced relation from, and aligned with a plurality of said pairs of said straps of said grid which define said pairs of springs such that said bars extend between and are spaced from positions occupied by fuel rods when received in said cells of said grid, and (iii) a plurality of members supported by each of said holder bars, corresponding to said pairs of springs defined by said pair of straps aligned with said holder bar, (iv) each of said members having a terminal end configured to engage and retain said springs of one of said pairs thereof in their retracted positions when said respective holder bar supporting said member is aligned with and moved toward said pair of straps aligned with said holder bar, (v) each of said members being an elongated post with said terminal end of said member being a bifurcated end on said post defining at least one pair of spaced apart fingers adapted to receive said pair of springs therebetween for retaining said springs in their retracted positions;

(b) said holder bars of said respective first and second spring retainer assemblies having mating means permitting said assemblies to be superimposed one on top of the other in criss-cross fashion and interconnected in alignment with all of said pairs of springs defined by said straps of said grid.

7. The spring retainer apparatus as recited in claim 6, wherein said mating means on said holder bars are in the form of aligned notches defined in said bars of said first and second spring retainer assemblies.

8. The spring retainer apparatus as recited in claim 6, wherein said bifurcated end on each of said posts defines two spaced pairs of spaced apart fingers adapted to receive said pair of springs therebetween and engage said spring pair at two displaced locations therealong for retaining them in their retracted positions.

9. The spring retainer apparatus as recited in claim 6, wherein each member in said plurality thereof supported by a respective one holder bar is rigidly connected to and extends from said bar in a generally parallel relationship with respect to the other members of said plurality thereof supported by said bar.

10. The spring retainer apparatus as recited in claim 6, wherein said bifurcated terminal end of each member defines a pocket adapted to receive said pair of springs therein and retain said springs in their retracted positions and a convergently-tapered entrance to said pocket for facilitating insertion of said springs when in their retracted positions into said pocket.

11. The spring retainer apparatus as recited in claim 6, wherein said bifurcated terminal end of each member defines a pocket adapted to receive said pair of springs therein and retain said springs in their retracted positions and a convergently-tapered entrance to said pocket for causing deflection of said springs from their normal expanded positions to their retracted positions and facilitating insertion of said retracted springs into said pocket.

12. For use with a fuel assembly having a least one grid formed of interleaved straps defining a plurality of hollow cells for respectively receiving a plurality of fuel rods, at least some of said straps being disposed in pairs thereof so as to form springs in pairs thereof being positioned in back-to-back relationships between adjacent ones of said cells, said springs in each pair thereof being configured to normally assume expanded positions in which they are displaced away from one another to engage fuel rods received in said respective cells and being deflectible to retracted positions in which they are displaced toward one another to allow loading of the fuel rods in said respective cells without engaging said springs, a spring retainer method for facilitating the loading of said fuel rods into said cells of said fuel assembly grid, comprising the steps of:
 (a) aligning a plurality of elongated holder bars with pairs of said straps of said grid which defines said pairs of springs such that said holder bars extend along, and in spaced relation from, said strap pairs and between and spaced from positions occupied by fuel rods when received in said cells of said grid; and
 (b) moving said holder bars toward said pairs of said straps to insert bifurcated terminal ends of members supported by each of said holder bars about and in engagement with said springs to retain said springs in their retracted positions within the bifurcated terminal ends of the members.

13. The spring retainer method as recited in claim 12, wherein said moving of said holder bars toward said strap pairs causes deflection of said springs from normal expanded positions to retracted positions and retention of said retracted springs in their retracted positions.

* * * * *